(12) United States Patent
Hill et al.

(10) Patent No.: US 9,052,745 B2
(45) Date of Patent: Jun. 9, 2015

(54) METHOD OF DISPLAYING APPLICATIONS IN A MULTI-MONITOR COMPUTER SYSTEM AND MULTI-MONITOR COMPUTER SYSTEM EMPLOYING THE METHOD

(75) Inventors: Douglas B. Hill, Calgary (CA); Michael Rounding, Calgary (CA); Daniel Mitchell, Calgary (CA); David Martin, Calgary (CA); Luqing Wang, Calgary (CA); Gregory Forrest, Calgary (CA)

(73) Assignee: SMART Technologies ULC (CA)

( * ) Notice: Subject to any disclaimer, the term of this patent is extended or adjusted under 35 U.S.C. 154(b) by 1074 days.

(21) Appl. No.: 13/061,888

(22) PCT Filed: Sep. 3, 2009

(86) PCT No.: PCT/CA2009/001223
§ 371 (c)(1),
(2), (4) Date: Jun. 20, 2011

(87) PCT Pub. No.: WO2010/025557
PCT Pub. Date: Mar. 11, 2010

(65) Prior Publication Data
US 2011/0241985 A1    Oct. 6, 2011

Related U.S. Application Data

(60) Provisional application No. 61/094,046, filed on Sep. 3, 2008.

(51) Int. Cl.
*G06F 3/033*    (2013.01)
*G06F 3/01*    (2006.01)
(Continued)

(52) U.S. Cl.
CPC ............ *G06F 3/017* (2013.01); *G06F 3/04883* (2013.01); *G06F 3/1415* (2013.01);
(Continued)

(58) Field of Classification Search
CPC ......... G06F 3/016; G06F 3/011; G06F 3/038; G06F 3/1423; G06F 3/1446; G06F 3/1431
USPC ............................ 345/1.1–1.3, 156–158, 173
See application file for complete search history.

(56) References Cited

U.S. PATENT DOCUMENTS

| 6,803,906 B1 | 10/2004 | Morrison et al. |
| 6,972,401 B2 | 12/2005 | Akitt et al. |

(Continued)

FOREIGN PATENT DOCUMENTS

| CN | 101276253 A | 10/2008 |
| EP | 1526445 A2 | 4/2005 |
| WO | 2009/086631 A1 | 7/2009 |

OTHER PUBLICATIONS

Communication: Transmittal of International Search Report; International Search Report; and Written Opinion for International Patent Application No. PCT/CA2009/001223 mailed Dec. 16, 2009.

(Continued)

*Primary Examiner* — Kimnhung Nguyen
(74) *Attorney, Agent, or Firm* — Katten Muchin Rosenman LLP

(57) ABSTRACT

A multi-monitor computer system includes a plurality of display devices communicating with at least one computing device executing an application management procedure. The application management procedure enables an application window available on one display device to be moved entirely to another display device by selecting the other display device from a dialog box displayed in response to a pointer-dragging input gesture on the application window.

13 Claims, 12 Drawing Sheets

(51) Int. Cl.
*G06F 3/0488* (2013.01)
*G06F 3/14* (2006.01)

(52) U.S. Cl.
CPC ............ *G06F3/1454* (2013.01); *G06F 3/1423* (2013.01); *G09G 2340/0464* (2013.01); *G09G 2370/042* (2013.01); *G09G 2370/16* (2013.01)

(56) References Cited

U.S. PATENT DOCUMENTS

| | | | |
|---|---|---|---|
| 7,161,557 | B2 | 1/2007 | Thornton |
| 7,236,162 | B2 | 6/2007 | Morrison et al. |
| 7,432,876 | B2 | 10/2008 | Okuley |
| 2004/0024819 | A1 | 2/2004 | Sasaki et al. |
| 2004/0263424 | A1 | 12/2004 | Okuley |
| 2006/0033712 | A1 | 2/2006 | Baudisch et al. |
| 2007/0064004 | A1 | 3/2007 | Bonner et al. |
| 2008/0148184 | A1 | 6/2008 | Davis |

OTHER PUBLICATIONS

Notification Of The First Office Action for Chinese Patent Application No. 200980142646.0 with a mailing date of May 20, 2013.
Extended European Search Report for European Patent Application No. 09 81 0963 with a mailing date of Jul. 19, 2011.
Apr. 8, 2014 Office Action for European Patent Application No. 09810963.0.

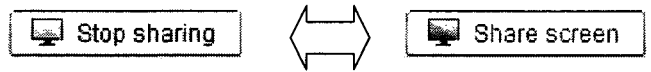

```
Rectangle shared_rect = EmptyRect
Bitmap previous_screen = EmptyBitmap // used to calculate deltas
between screens function ShareScreenButtonClicked(Integer monitor_index)
  if (GetMonitorForRectangle(shared_rect) == monitor_index)
    StopSharing()
  else
    if (!IsEmptyRect(shared_rect))
      StopSharing()
    StartSharing(GetRectangleForMonitor(monitor_index))

function StopSharing()
  StopTimer(screencapturetimer)
  SendMessageToMeetingParticipants(new
SharingStoppedMessage)
  shared_rect = EmptyRect
  previous_screen = EmptyBitmap function StartSharing(Rectangle rect_to_share)
  shared_rect = rect_to_share
  StartTimer(screencapturetimer)
  SendMessageToMeetingParticipants(new
SharingStartedMessage(shared_rect))

function TimerTicked(Integer timer_index)
  if timer_index == screencapturetimer
    Bitmap new_screen = CaptureScreen(shared_rect)
    ByteArray screen_diffs = null
    if (previous_screen == EmptyBitmap)
      screen_diffs = GenerateKeyFrame(new_screen)
    else
      screen_diffs = GenerateDelta(new_screen, previous_screen)
    previous_screen = new_screen
    SendMessageToMeetingParticipants(new
SharingDataMessage(screen_diffs))
```

Fig. 7

METHOD OF DISPLAYING APPLICATIONS IN A MULTI-MONITOR COMPUTER SYSTEM AND MULTI-MONITOR COMPUTER SYSTEM EMPLOYING THE METHOD

This application is a national stage of PCT/CA2009/001223, filed on Sep. 3, 2009, which claims priority to U.S. Provisional Patent Application No. 61/094,046, filed on Sep. 3, 2008. Each of these documents is incorporated herein by reference in its entirety.

FIELD OF THE INVENTION

The present invention relates generally to multi-monitor computer systems and in particular, to a method of displaying applications in a multi-monitor computer system and to a multi-monitor computer system employing the method.

BACKGROUND OF THE INVENTION

Multi-monitor computer systems comprising multiple physical display devices connected to a common computing device such as for example a personal computer or the like, in order to provide an increased display area for computer programs running on the computing device, are becoming increasingly more popular. Depending on the environment, the physical display devices may be of different types (i.e. liquid crystal displays (LCDs), cathode ray tubes (CRTs), interactive whiteboards (IWBs), other display panels or devices etc.) and/or different sizes. In order to accommodate multiple physical display devices, video cards in many computing devices have multiple sockets to receive cables from more than one physical display device. Alternatively, some computing devices have multiple video cards to receive cables from more than one physical display device. In either case, video data generated by the video card(s) of the computing device in response to execution of one or more computer programs is output to the appropriate physical display device for display. Other multi-monitor computer systems have networked physical display devices where the physical display devices are connected via a wireless or wired network and video data is provided to the physical display devices via the network connection for display.

As is well known in Windows™-type operating system environments, when an application is to be launched as a result of being selected through a double-click mouse or similar event, the operating system creates an instance of the selected application and launches the selected application within a window presented on the physical display device. The window for the selected application is typically placed in one of two positions; either at its location of last use or at a default location. When it is desired to move an application window from one physical display device to another, the user must manipulate the displayed application window so that the application window is moved to the desired physical display device. When the physical display devices are closely spaced, although having to manipulate the displayed application windows may be inconvenient, it is a task that can be readily performed by the user.

In multi-monitor computer systems that employ interactive whiteboards, to move an application window from one interactive whiteboard to an adjacent destination or target interactive whiteboard, the user must drag the application window to the side of the interactive whiteboard that is proximate the adjacent target interactive whiteboard so that the application window appears partly on the adjacent target interactive whiteboard. The user must then move to the adjacent target interactive whiteboard, select the application window that is partly displayed and then drag the application window to the desired location on the target interactive whiteboard. If the application window is to be moved to yet another adjacent target interactive whiteboard, the above procedure must be repeated. As will be appreciated, this procedure can be inconvenient especially when the interactive whiteboards are separated by significant distances leading to user frustration and a reduction in the utilization of software features.

Alternatively, icons on a toolbar associated with the application window can be used to move the application window to an adjacent target interactive whiteboard, in either the right or left direction as desired, as described in PCT Application No. WO 2009/086631 to Leung et al. entitled "METHOD OF MANAGING APPLICATIONS IN A MULTI-MONITOR COMPUTER SYSTEM AND MULTI-MONITOR COMPUTER SYSTEM EMPLOYING THE METHOD" assigned to SMART Technologies ULC, of Calgary, Alberta, Canada, assignee of the subject application, the content of which is incorporated by reference. In this environment, when it is desired to move an application window to an adjacent target interactive whiteboard, the user must move to the interactive whiteboard on which the application window to be moved is displayed and select the right or left icon to move the application window to the desired adjacent target interactive whiteboard. Above-incorporated PCT Application No. WO 2009/086631 also describes allowing the left or right icons to persist on the interactive whiteboard for a threshold period determined by a timer to permit a user to initiate subsequent application window moves without having to move to another interactive whiteboard.

Known conferencing and meeting management applications, such as Meeting Pro™ offered by SMART Technologies ULC, of Calgary, Alberta, Canada, assignee of the subject application, provide the ability for a user to click on a toolbar menu, display a dialog box comprising a list of application windows, and select an application window to be moved to a particular physical display device. Meeting management applications such as Meeting Pro™ have integrated conferencing solutions similar to Bridgit™, also offered by SMART Technologies ULC, of Calgary, Alberta, Canada in order to enable conference participants to view and share screens remotely from their own personal computers over a network. Using the Meeting Pro™ meeting management application for example, a meeting owner can create a new conference and provide a meeting name and unique session connection code to participants invited to the conference. Invited participants who select the meeting name and enter the unique session connection code, are connected to the Meeting Pro™ meeting room over the conference connection.

When first joining a conference, the primary conference screen of the Meeting Pro™ meeting management application running on the meeting owner's personal computer, typically the meeting owner's desktop, is not immediately shared with the other conference participants. Thus, participants first joining a conference are not provided via their respective displays with any common conference screen and as a result, the participants are not provided with any immediate visual feedback signifying a successful conference connection. Instead, the meeting owner must undertake a series of steps in order to expressly share the primary conference screen with the other conference participants. Unfortunately, this lack of visual feedback may be interpreted by participants as a failed conference connection, causing the participants to disconnect from the conference and attempt a reconnect and/or to contact the meeting owner to sort out the perceived conference connection problem.

In addition to the above problem, in order for the meeting owner to determine who the conference participants are that are sharing the primary conference screen, the meeting owner is required to drill down into a menu structure to view the list of the participants who have successfully completed a conference connection. This opens the possibility for uninvited participants to gain access to the meeting owner's primary conference screen as uninvited participants cannot be readily identified.

It is therefore an object of the present invention at least to provide a novel method of displaying applications in a multi-monitor computer system, a novel multi-monitor computer system employing the method and a novel method of initiating a conference session.

SUMMARY OF THE INVENTION

In accordance with an aspect, there is provided a system comprising a plurality of displays devices operatively associated with at least one computing device executing an application management application, said application management application monitoring the displays and when an input gesture entered on an application window presented on one of displays is detected, presenting a selection of destination displays for said application window.

In accordance with another aspect, there is provided a method of managing applications in a multi-monitor computer system comprising a plurality of display devices, said method comprising: receiving a pointer-down input gesture on an application window; in the event that a threshold condition is satisfied by the input gesture, automatically displaying a dialog box with a plurality of potential destination display devices; receiving the user's selection of a destination display device; and in response to the user's selection, moving the application window entirely into the selected destination display device.

In accordance with another aspect, there is provided a computer readable medium embodying a computer program for managing applications in a multi-monitor computer system comprising a plurality of display devices, said computer program comprising: program code for receiving a pointer-down input gesture on an application window; program code for, in the event that a threshold condition is satisfied by the input gesture, automatically displaying a dialog box with a plurality of potential destination display devices; program code for receiving the user's selection of a destination display device; and program code for, in response to the user's selection, moving the application window entirely into the selected destination display device.

In accordance with another aspect, there is provided a method for establishing a conference session, comprising: creating a conference session for a primary computer having a primary display device; and automatically sharing the contents of the primary display device with a participant display device via the conference session when a participant joins the conference.

According to an embodiment, a participants indicator is displayed on the primary display device with the number of other participants with whom the contents of a selected display device are being shared. According to an embodiment, in response to selecting the participant indicator a dialog box identifying the conference participants is presented.

BRIEF DESCRIPTION OF THE DRAWINGS

Embodiments will now be described more fully with reference to the accompanying drawings in which:

FIG. 5c is an enlarged view of the meeting toolbar of FIG. 5a;

FIG. 7 shows pseudocode for the operation of a meeting management application when the sharing selection icon of the meeting toolbar is selected;

FIG. 8b is a dialog box associated with the participants indicator of FIG. 8a;

DETAILED DESCRIPTION OF THE EMBODIMENTS

Figure 1:
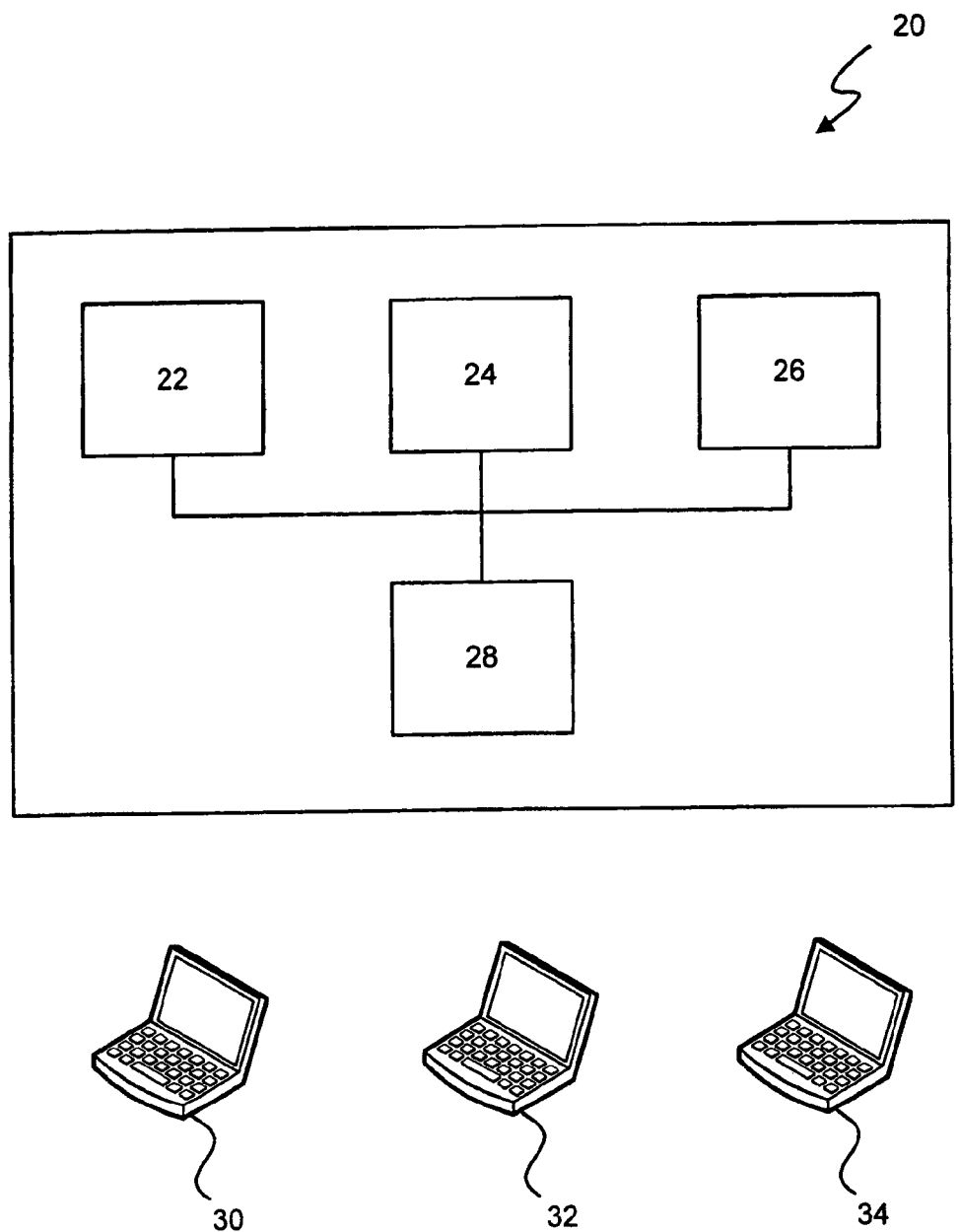
FIG. 1 is a schematic representation of a multi-monitor computer system.

Turning now to FIG. 1, a multi-monitor computer system is shown and is generally identified by reference numeral 20. As can be seen, in this embodiment the multi-monitor computer system comprises a plurality of physical display devices 22, 24 and 26, each of which is connected to a common computing device, in this case a central computer 28. The physical display devices 22, 24 and 26 may take a variety of forms. For example, the physical display devices may be monitors (i.e. liquid crystal displays (LCDs), cathode ray tubes (CRTs), plasma display devices or other type of display panel) of the same type or of different types and/or may be of the same or different resolution. Alternatively, the physical display devices 22, 24 and 26 may be interactive whiteboards (IWBs). Each IWB may be one of a number of types including but not limited to analog resistive, capacitive, camera-based, electromagnetic, surface acoustic wave etc. Of course, the physical display devices 22, 24 and 26 may be a combination of monitors and IWBs.

One or more other local and/or remote computing devices also communicate with the central computer 28. In this embodiment, three (3) local laptop computers 30, 32 and 34 are shown communicating with the central computer 28. The laptop computers 30, 32 and 34 may communicate with the central computer 28 via windows sharing software over wired communication links such as for example Ethernet or universal serial bus (USB) connections, or may communicate with the central computer 28 over wireless communication links such as for example radio frequency (RF) or BlueTooth™ connections. Although not shown, one or more other remote computing devices such as for example laptop computers, desktop computers or the like may communicate with the central computer 28 via windows sharing software over an Internet, virtual private network (VPN) or similar communication link. The windows sharing software may be one of a variety of types such as that offered by SMART Technologies ULC under the name Synchroneyes™, Bridgit™ or LinQ™ or that offered by third parties under the name WebEx™, Microsoft Remote Desktop™, Netmeeting™, Windows Live™ or VNC™. Those of skill in the art will appreciate that the number of physical display devices and laptop computers shown in FIG. 1 is simply for ease of illustration. The multi-monitor computer system 20 may in fact include more or fewer physical display devices and laptop computers than those shown.

Figure 2:
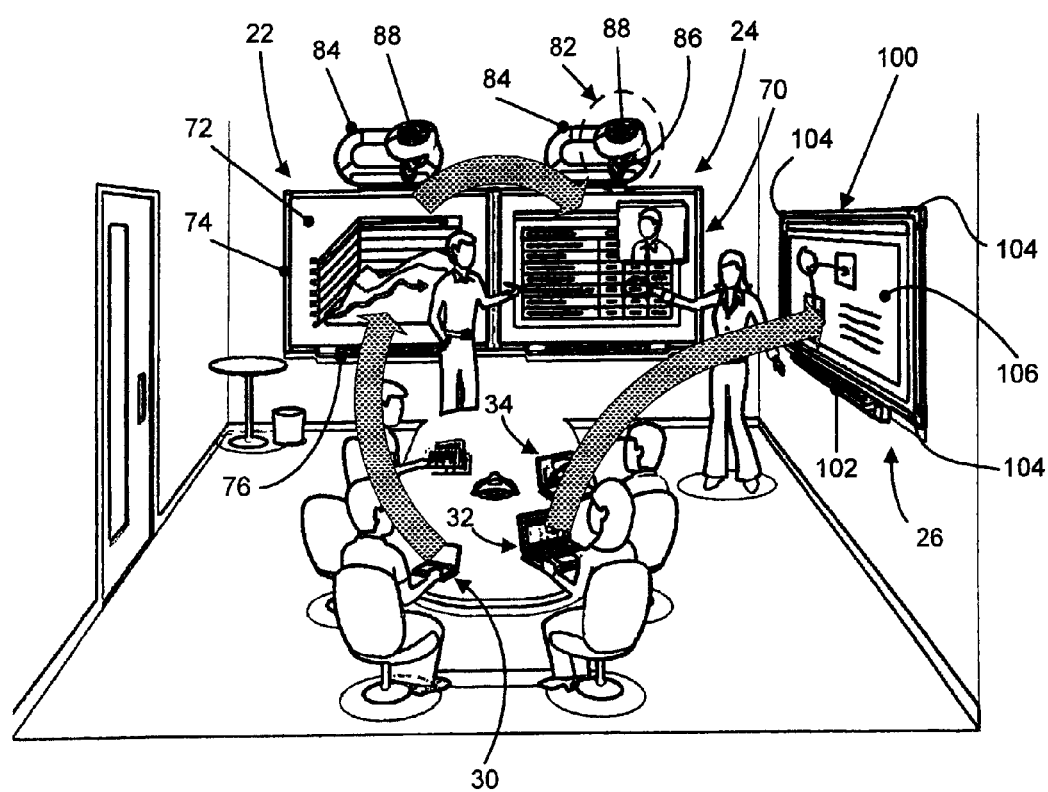
FIG. 2 shows a multi-monitor computer system deployed in a meeting room and comprising a plurality of interactive whiteboards, a central computer and a plurality of laptop computers.
Figure 3:
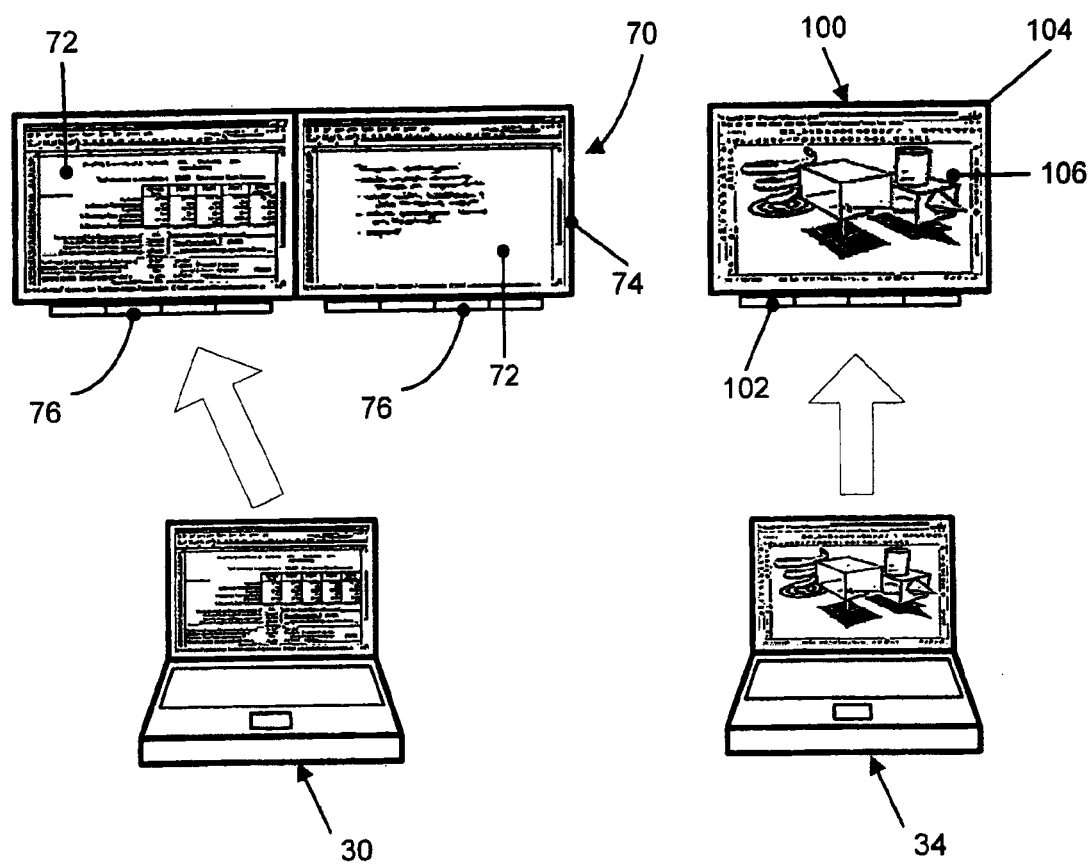
FIG. 3 shows the interactive whiteboards and two laptop computers of FIG. 2, the desktops of the laptop computers being displayed on two of the interactive whiteboards.

FIGS. 2 and 3 show the multi-monitor computer system 20 deployed in a meeting room and with the physical display devices 22, 24 and 26 taking the form of interactive whiteboards (IWBs) mounted on the walls of the meeting room at physically spaced locations. Each IWB 22, 24 and 26 is connected to the central computer 28 either via a cable that is received by a respective socket of a video card installed in the central computer 28 or via a network connection. The laptop computers 30, 32 and 34 in this configuration communicate with the central computer 28 via wireless communication links. Alternatively, each IWB 22, 24 and 26 may comprise an embedded processing unit that controls its display and that receives communication directly from one or more of the laptop computers 30, 32 and 34.

In this embodiment, IWBs 22 and 24 are 600i series interactive whiteboards manufactured by SMART Technologies ULC, of Calgary, Alberta, Canada, assignee of the subject application. As can be seen, each IWB 22, 24 comprises an analog resistive touch screen 70 having a touch surface 72. The touch surface 72 is surrounded by a bezel 74. A tool tray 76 is affixed to the bezel 74 adjacent the bottom edge of the touch surface 72 and accommodates one or more tools that are used to interact with the touch surface 72.

A boom assembly 82 is mounted above the touch screen 70 via a mounting bracket 84. The boom assembly 82 comprises a generally horizontal boom 86 that extends outwardly from the mounting bracket 84 and supports a projector 88 adjacent its distal end. The projector 88 is aimed at the touch screen 70 so that the image projected by the projector 88 is presented on the touch surface 72.

During operation of each IWB 22, 24, the projector 88 receives video output from the personal computer 28 and projects a video image onto the touch surface 72. The video image may be the desktop of the central computer 28 or the desktop of one of the laptop computers 30, 32 and 34. When a user contacts the touch surface 72 with a pointer such as a finger, pen tool, or other object, the contact is detected by the IWB and the position of the contact in touch screen (x,y) coordinates is conveyed to the central computer 28. The central computer 28 in response maps the touch screen (x,y) coordinates to the computer display coordinates and processes the resultant input. Depending on the nature of the resultant input, the touch surface contact may be treated as writing or drawing or as a mouse event. As a result, pointer contacts on and pointer movement across the touch surface 72 can be recorded by the central computer 28 as writing or drawing or used to control execution of one or more application programs loaded on the central computer 28. The central computer 28 also updates the video output conveyed to the projector 88 so that the video image presented on the touch surface 72 reflects the pointer activity.

IWB 26 is a DViT camera-based interactive whiteboard manufactured by SMART Technologies ULC, of Calgary, Alberta, Canada, assignee of the subject application and is similar to those described in U.S. Pat. Nos. 6,803,906; 6,972,401; and 7,236,162. The IWB 26 comprises a rectangular bezel or frame 100 surrounding the display screen of a projection device such as for example a plasma display or LCD. A tool tray 102 is affixed to the bezel 100 and accommodates one or more pen tools that are used to interact with the projection device. The projection device receives video output from the central computer 28 and displays a video image on its display screen 106. Digital cameras 104 are provided adjacent at least two corners of the bezel 100. The digital cameras 104 have overlapping fields of view that encompass and look generally across the display screen 106 from different viewpoints or vantages.

During operation, the digital cameras 104 acquire images generally looking across the display screen 106. Image data acquired by the digital cameras 104 is processed by on-board digital signal processors to determine if a pointer exists in the captured image data. When it is determined that a pointer exists in the captured image data, the digital signal processors generate pointer information packets (PIPs) and convey the PIPs to a master controller. Upon receipt of the PIPs, the master controller processes the PIPs and using triangulation, determines the location of the pointer in the captured images relative to the display screen (x,y) coordinates. In this manner, as PIPs are generated in response to captured images, the position and movement of the pointer over the display screen 106 can be tracked turning the display screen 106 of the projection device into an interactive touch surface. The display screen (x,y) coordinates generated by the master controller are conveyed to the central computer 28. Similarly, the central computer 28 in response maps the display screen (x,y) coordinates to computer display coordinates and processes the resultant input. Depending on the nature of the resultant input, the display screen 106 contact may be treated as writing or drawing or as a mouse event. As a result, pointer contacts on and pointer movement across the display screen 106 can be recorded by the central computer 28 as writing or drawing or used to control execution of one or more application programs loaded on the central computer 28. The personal computer 28 also updates the video output conveyed to the projection device so that the video image presented on its display screen 106 reflects the pointer activity.

In this embodiment, the central computer 28 runs a meeting management application such as for example Meeting Pro™ and comprises a conference server to enable a meeting owner using the central computer 28 to initiate and carry out a conference session or meeting. If desired, the conference server may be separate from the central computer 28 and connected to the central computer 28 via a network. Local and/or remote computing devices such as the laptop computers 30, 32 and 34 of other users wishing to participate in a conference session initiated by the meeting owner also run the meeting management application.

Figure 4A:
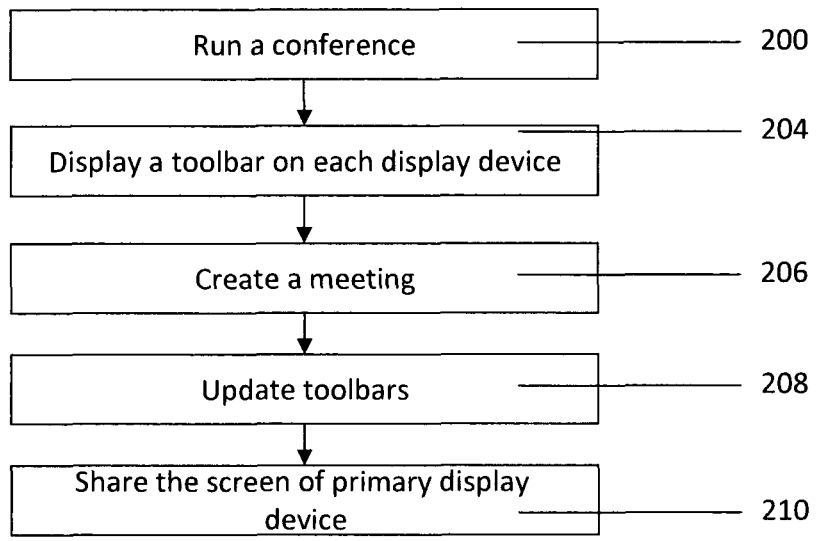
FIG. 4a is a flowchart illustrating steps performed by the central computer upon initiation of a conference session.

FIG. 4a illustrates steps performed during initiation of a conference session using the meeting management application running on the central computer 28. When a meeting owner selects the meeting management application from the desktop of the central computer 28 in order to initiate a conference session (step 200), a meeting toolbar 140 (see FIGS. 5a and 5c) is displayed on the desktop 142. The desktop with the meeting toolbar form a primary conference screen. The meeting management application then instructs the central computer 28 to initiate a poll to determine the physical display devices that are connected to the central computer 28. For example, in the meeting room environment of FIG. 2, during pulling, the central computer 28 determines that IWBs 22, 24 and 26 are connected to the central computer 28. The meeting toolbar 140 is then displayed on each physical display device that is determined to be connected to the central computer 28 (step 204). In this embodiment, the meeting toolbars are positioned adjacent the top edges of the IWB touch surfaces 72, 106 although those of skill in the art will appreciate that the meeting toolbars may be displayed on the IWB touch surfaces at any desired positions. Also, if desired the meeting management application can be conditioned to display the meeting toolbar 140 only on a subset of the IWBs.

If the central computer 28 is located in a meeting room where conferences are generally continuously being held, the central computer 28 can be conditioned to always run the meeting management application thereby to ensure that the meeting toolbar is always displayed on the central computer 28 and the physical display devices 22, 24 and/or 26.

When the meeting owner instructs the meeting management application to create a meeting (step 206), the meeting owner is prompted to enter a meeting name. Once the meeting name has been entered, the meeting management application generates a session connection code for the conference session. The meeting management application conveys the meeting name and session connection code to the conference server for inclusion in an active conference session list maintained by the conference server and then instructs the conference server to update the meeting toolbars 140 displayed on the physical display devices connected to central computer 28 so that the meeting toolbars present the meeting name and the session connection code (step 208), as will be further described below. Next, the meeting management application instructs the conference server to automatically share the primary conference screen with the physical display devices so that the primary conference screen is displayed by the physical display devices (step 210). At this stage, users of other local and/or remote computing devices such as the laptop computers 30, 32 and 34 are able to join the conference session.

Figure 4B:
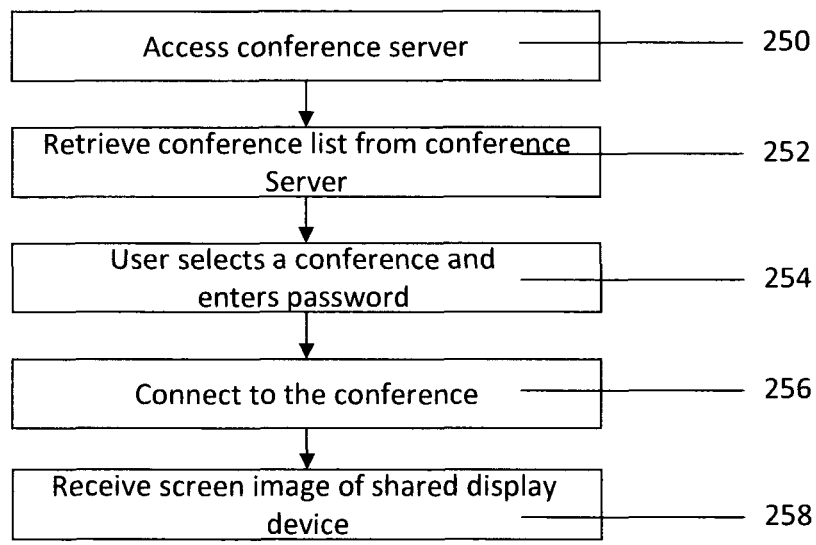
FIG. 4b is a flowchart illustrating steps performed upon connection of a user to an existing conference session.

FIG. 4b illustrates steps performed when a user of a local or remote computing device running the meeting management application wishes to become a participant to an existing conference session. When the user selects to join the existing conference session (step 250), the meeting management application retrieves the active conference session list from the conference server and displays the active conference session list (step 252). After the user has selected the desired conference session from the active conference session list, the meeting management application prompts the user to enter the session connection code associated with the selected conference session. The session connection code is typically provided to the user in person, by telephone, email, VoIP, instant messaging or by some other suitable means. (step 254).

Once the user has entered the session connection code, the meeting management application sends the selected conference session and session connection code to the conferencing server. The conferencing server upon receipt of the selected conference and session connection code, grants the user a connection to the conference session giving the user participant status (step 256). The conference screen that is currently being shared is automatically sent to the participant's computing device and displayed (step 258) providing the new participant with immediate visual feedback signifying a successful conference session connection. This allows the new participant to focus attention immediately on the shared screen, as opposed to having to wait for the shared screen to appear.

Figure 5A:
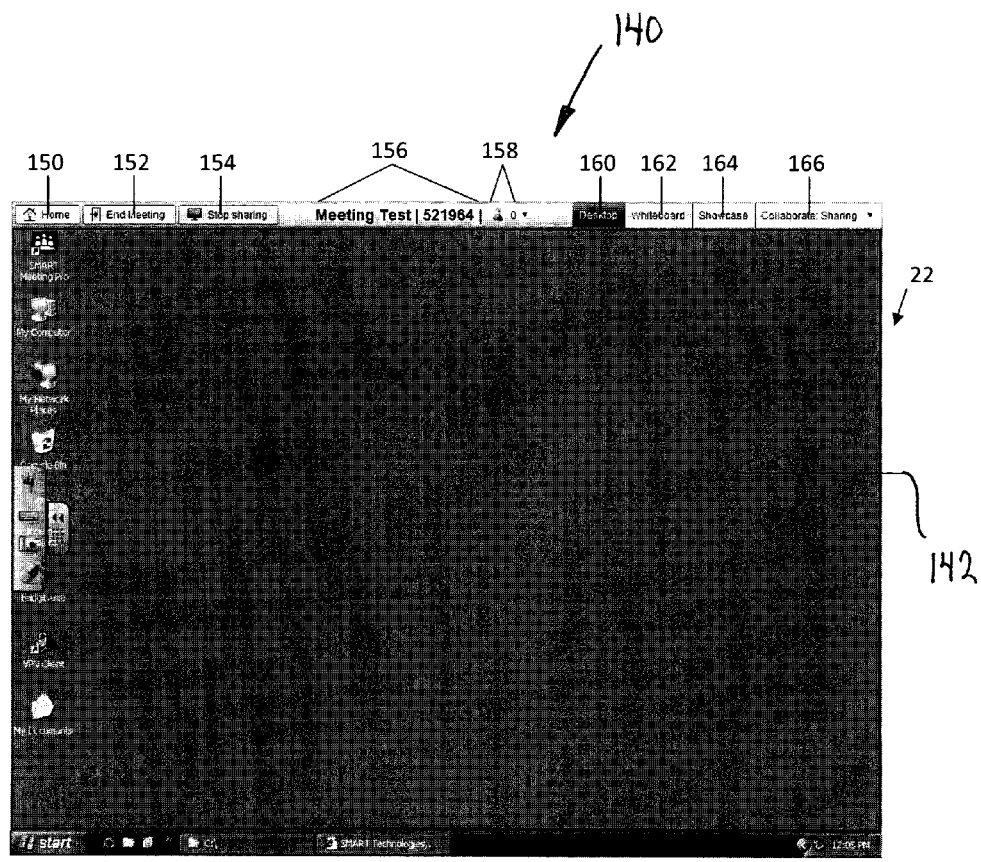
FIG. 5a shows a primary conference screen including a meeting toolbar.
Figure 5B:
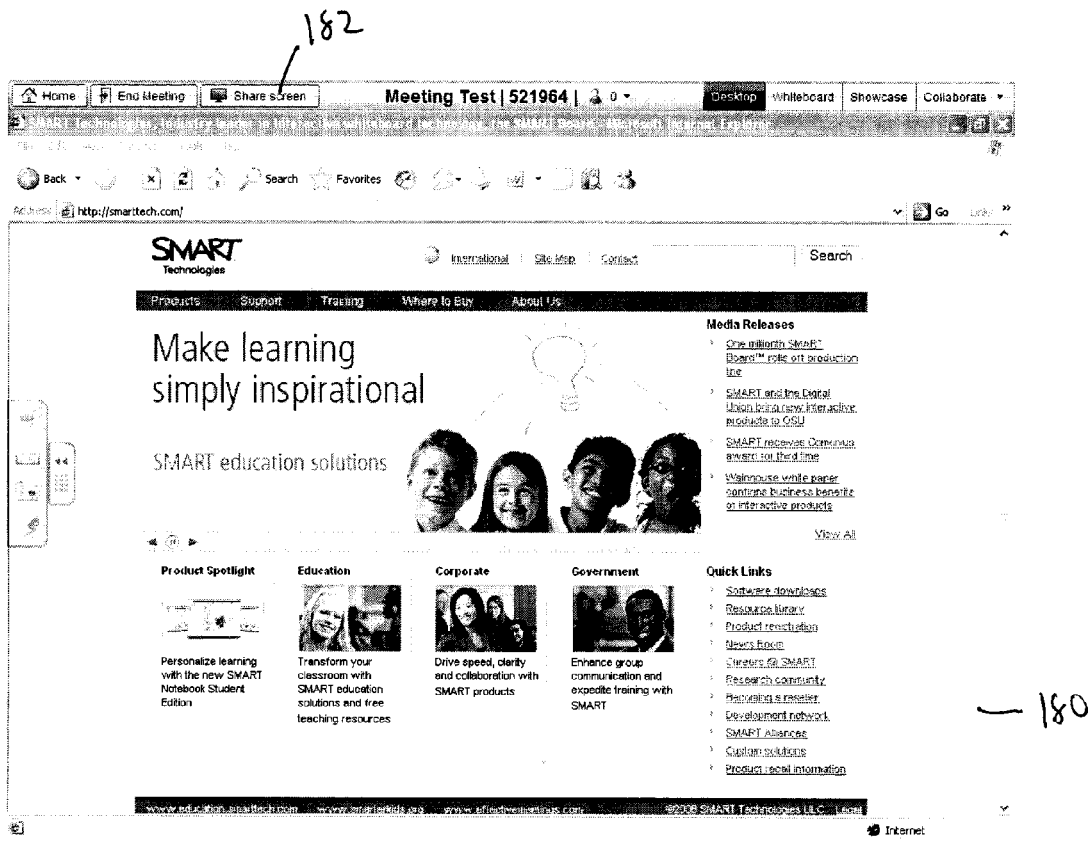
FIG. 5b shows another conference screen including the meeting toolbar.

FIG. 5a shows the primary conference screen displayed by the central computer 28 while FIG. 5b shows the meeting toolbar 140 of the primary conference screen in isolation. As can be seen, the meeting toolbar comprises a selectable home icon 150, a selectable end meeting icon 152, a selectable stop sharing icon 154, a selectable desktop icon 160, a selectable whiteboard icon 162, a selectable showcase icon 164 and a selectable collaborate sharing icon 166. The meeting toolbar 140 also comprises a display area 156 in which the meeting name and the session connection code are presented and a participants indicator 158 comprising a dialog box arrow.

Selection of the end meeting icon 152, at any time during a conference session, prompts the meeting management application to send a terminate conference session instruction to the conference server. In response, the conference server automatically terminates all of the conference connections so that screen sharing ceases. Optionally, if desired, selection of the end meeting icon 152 can also prompt the meeting management application to terminate all running applications on the central computer 28. In this case, if there is any unsaved content associated with an active application running on the central computer or any unsaved IWB content, the meeting management application prompts the user to save the content. In this embodiment, the end meeting icon 152 is only available to the meeting owner and/or each designated participant having particular administrative privileges.

Figure 5C:
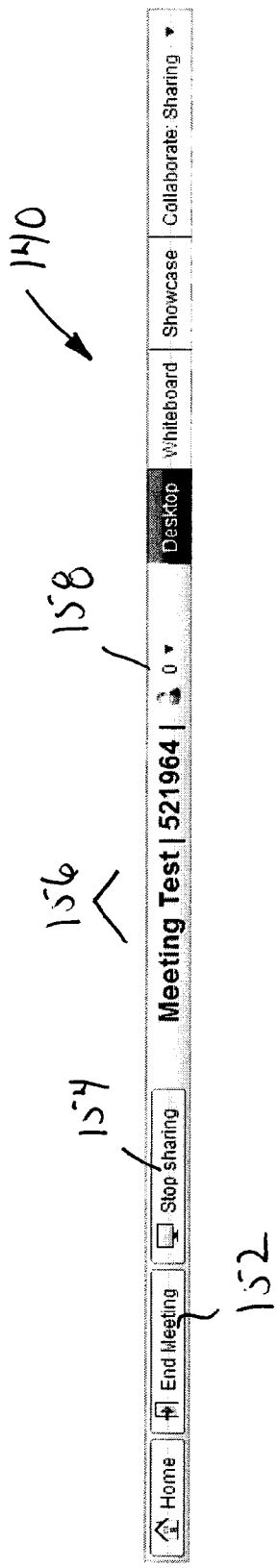

Selection of the stop sharing icon 154 prompts the meeting management application to stop sharing the current screen. In response, the shared screen is removed from the physical display devices 22, 24 and 26 and local and/or remote computing devices of other participants. In this case, the meeting management application running on the central computer 28 updates the meeting toolbar 140 to replace the stop sharing icon 154 with a share screen icon 182 as shown in FIG. 5c. If the meeting owner selects the share screen icon 182, the meeting management application resumes sharing the current screen.

If the meeting owner opens another application during the conference session which results in an application window for the application opening and being displayed by the central computer, the meeting toolbar is displayed in the application window. As the application window is not currently being shared by the central computer, the meeting toolbar includes the share screen icon. FIG. 5c shows a "maximized" application window 180 displayed by the central computer 28 that is not being shared with the physical display devices 22, 24 and 26 or with other the local and/or remote computing devices of other conference participants. The share screen icon 182 signifies to the meeting owner that the screen is not being shared with the physical display devices or other conference participants. If the meeting owner selects the share screen icon, the meeting management application stops sharing the existing screen and begins sharing the application window. The meeting management application also updates the meeting toolbar displayed on the application window so that the share screen icon 182 is replaced with the stop sharing icon 154.

Figure 6:
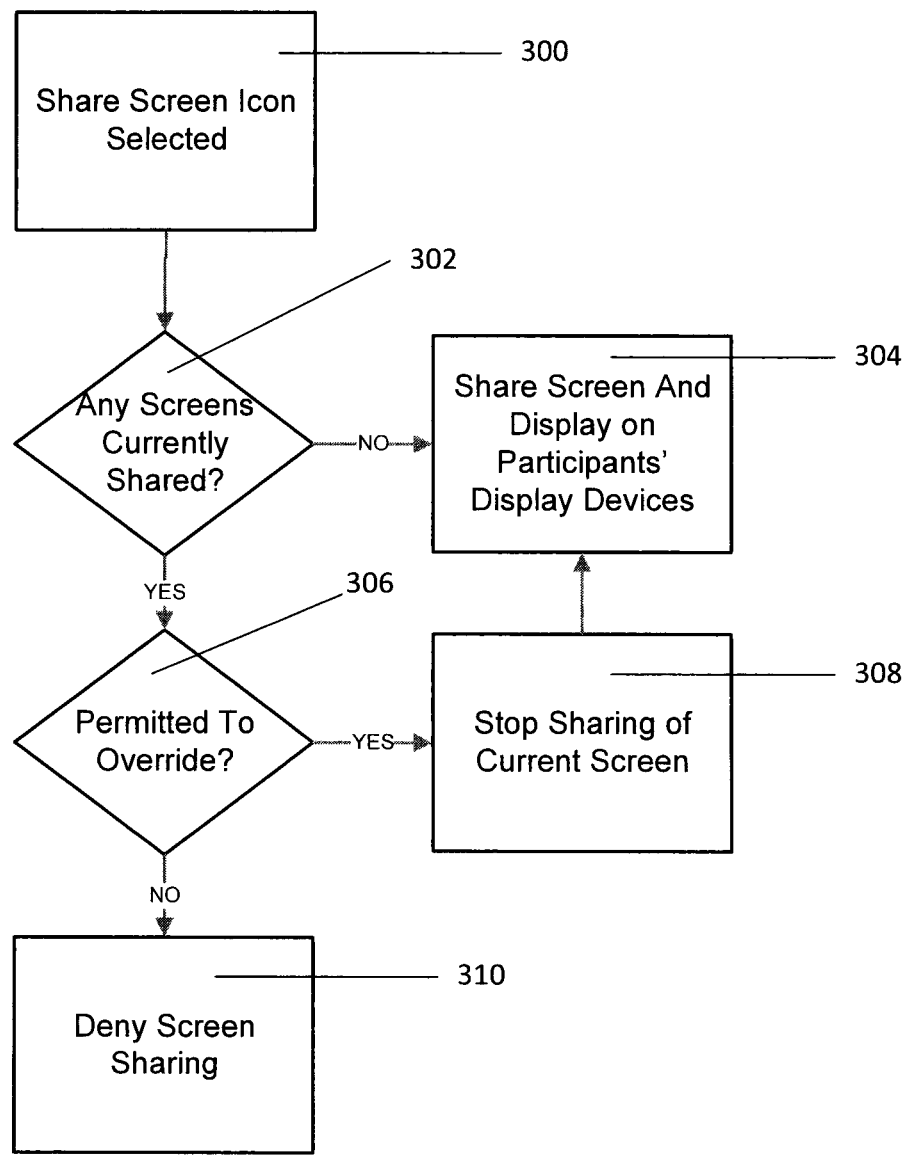
FIG. 6 is a flowchart illustrating steps performed upon selection of a sharing selection icon forming part of the meeting toolbar.

Initially, when a conference session has been established, the primary conference screen from the central computer display is shared with the physical display devices and local and/or remote computing devices. Because the screens of the physical display devices and local and/or remote computing devices are not being shared, the meeting toolbars displayed on the physical display devices and local and/or remote computing devices include the share screen icon. If a share screen icon 182 associated with one of the physical display devices or local or remote computing devices is selected (step 300 in FIG. 6), a screen share request is generated and conveyed to the meeting management application running on the central computer 28 causing the meeting management application to perform a check to determine if any screen is currently being shared (step 302). If not, the screen associated with the device that generated the screen share request is shared between the central computer, physical display devices and local and/or remote computing devices (step 304) and the meeting toolbars are updated so that the stop sharing icon is presented on the device sharing the screen and the share screen icon is presented on the other devices.

If a screen is currently being shared, a check is made to determine if the device that generated the screen share request has override status (step 306). If not, the screen share request is denied (step 310). If the device that generated the screen share request has override status (eg. the device is the central computer, is a device associated with a participant having administrative privileges or the conference session is democratic), sharing of the existing screen is terminated (step 308) and the screen associated with the device that generated the screen share request is shared (step 304). The meeting toolbars are also updated so that the stop sharing icon is presented on the device sharing the screen and the share screen icon is presented on the other devices. FIG. 7 shows pseudocode for the sharing and stop sharing functions performed by the meeting management application.

Figure 8A:
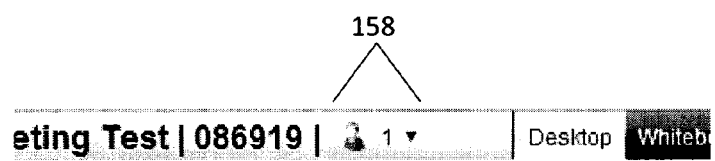
FIG. 8a is an enlarged view of a participants indicator forming part of the meeting toolbar.
Figure 8B:
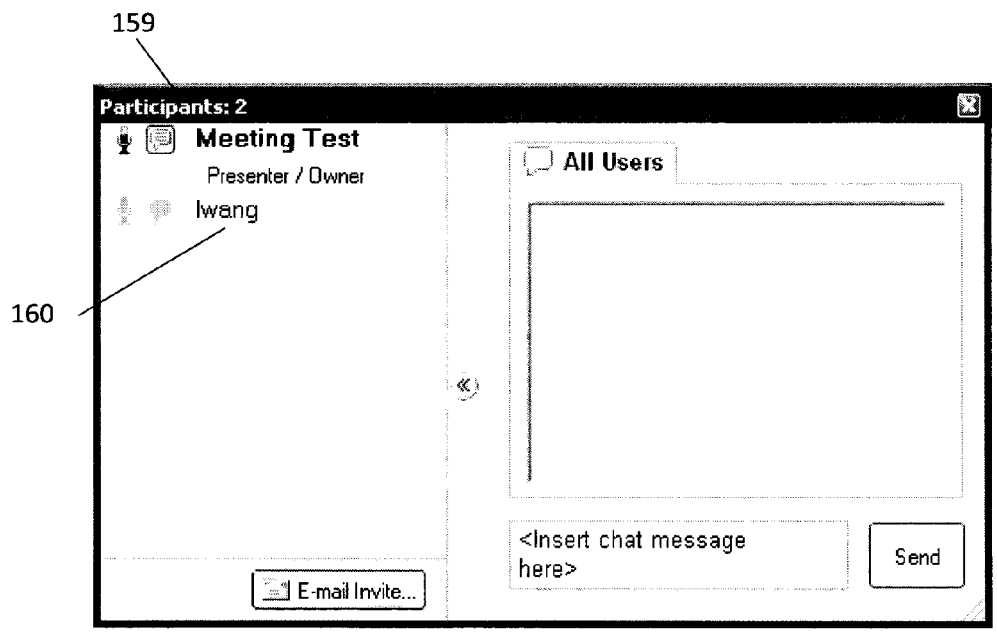

During the conference session, the conference server also updates the meeting toolbars so that the participants indicator 158 of each meeting toolbar identifies the total number of participants who are participating in the conference session. Selection of the participants indicator arrow results in a dialog box being displayed as shown in FIG. 8b. As can be seen, in this embodiment, the dialog box identifies the participants participating in the conference session by name. The dialog box 159 also provides several functions to enhance the conference session. The participant may invite other people to join the conference session by selecting an "E-mail Invite" button displayed in the dialog box, or may use a text window to send conference participants an instant message. If a participant's name 160 shown in the dialog box 159 is selected, a request is sent to that participant 160 to request that their screen be shared.

Alternatively, when a participant's name has been selected, that participant's screen could be immediately shared to all the conference participants. In the event that the participant has set their sharing to private, the participant's screen will not be shared and the meeting owner will be presented with a message indicating such.

As mentioned previously, in multi-monitor computer systems employing IWBs, difficulties can arise when a user wishes to move an application window displayed on one IWB to a remote destination IWB. To obviate these difficulties, the central computer runs an application management procedure to enable a user to easily change the location at which running applications are displayed as will now be described.

Figure 9:
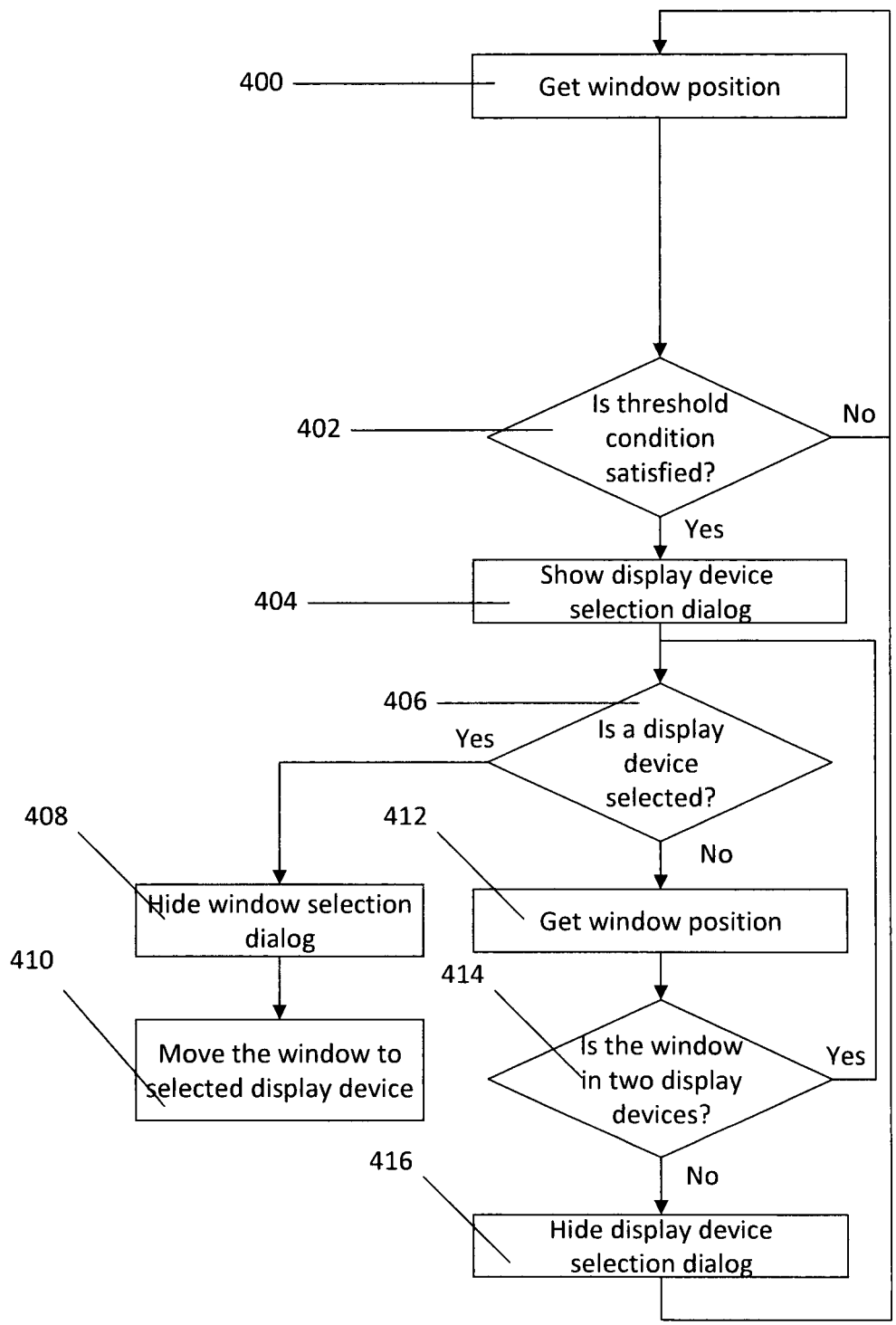
FIG. 9 is a flowchart illustrating steps performed during execution of an application management procedure executed by the central computer in response to a pointer-down input gesture on an application window.

Turning to FIG. 9, the steps performed by the application management application when an application window displayed on one physical display device is to be moved to another physical display device are shown. When running on the central computer, the application management application monitors the position of each application window displayed on the physical display devices (step 400) to determine whether pointer activity associated with an application window that meets a threshold condition has occurred and if so, automatically displays a destination physical display device selection dialog box on the physical display device that received the pointer activity. The threshold condition may vary depending upon whether or not the application window is maximized. For example, if the position of the application window is such that it is maximized, the threshold condition is a particular pointer-down input gesture on the title bar and/or the window canvas area. The input gesture may be a dragging motion for a predetermined distance. For example, in order to satisfy the threshold condition when the application window is maximized, a user may press a mouse button or touch a stylus on the title bar of the application window and then drag the pointer to the edge of the physical display device without releasing the mouse button or lifting the stylus up. Although the application window when maximized does not move with the dragging of the pointer over the title bar, the application management procedure detects the pointer-dragging input gesture on the application window by tracking the received pointer information packets (PIPs) and determines whether the input gesture satisfies the threshold condition.

The threshold condition when the application window is not maximized may be satisfied by detecting whether the application window has been dragged out of the physical display device by a predetermined amount by a pointer-dragging input gesture. Preferably the amount is a percentage of the application window width, such as 20% such that if the application window is dragged 20% out of the screen, the threshold condition is satisfied. Alternatively, the threshold condition to be satisfied is that the dragging on the window has resulted in the application window being partly out of the screen and the pointer being less than 20% of the physical display device width away from the screen edge. Alternatively, absolute thresholds could be used. Alternatively, the threshold condition to be satisfied is dragging the window partly out of the screen, and then pausing for a short period without releasing the mouse button or lifting the pointer. Alternative pointer-dragging input gestures, or relative positions of the application window upon performance of the pointer-dragging input gesture on the application window may be used as the threshold condition.

Figure 10:
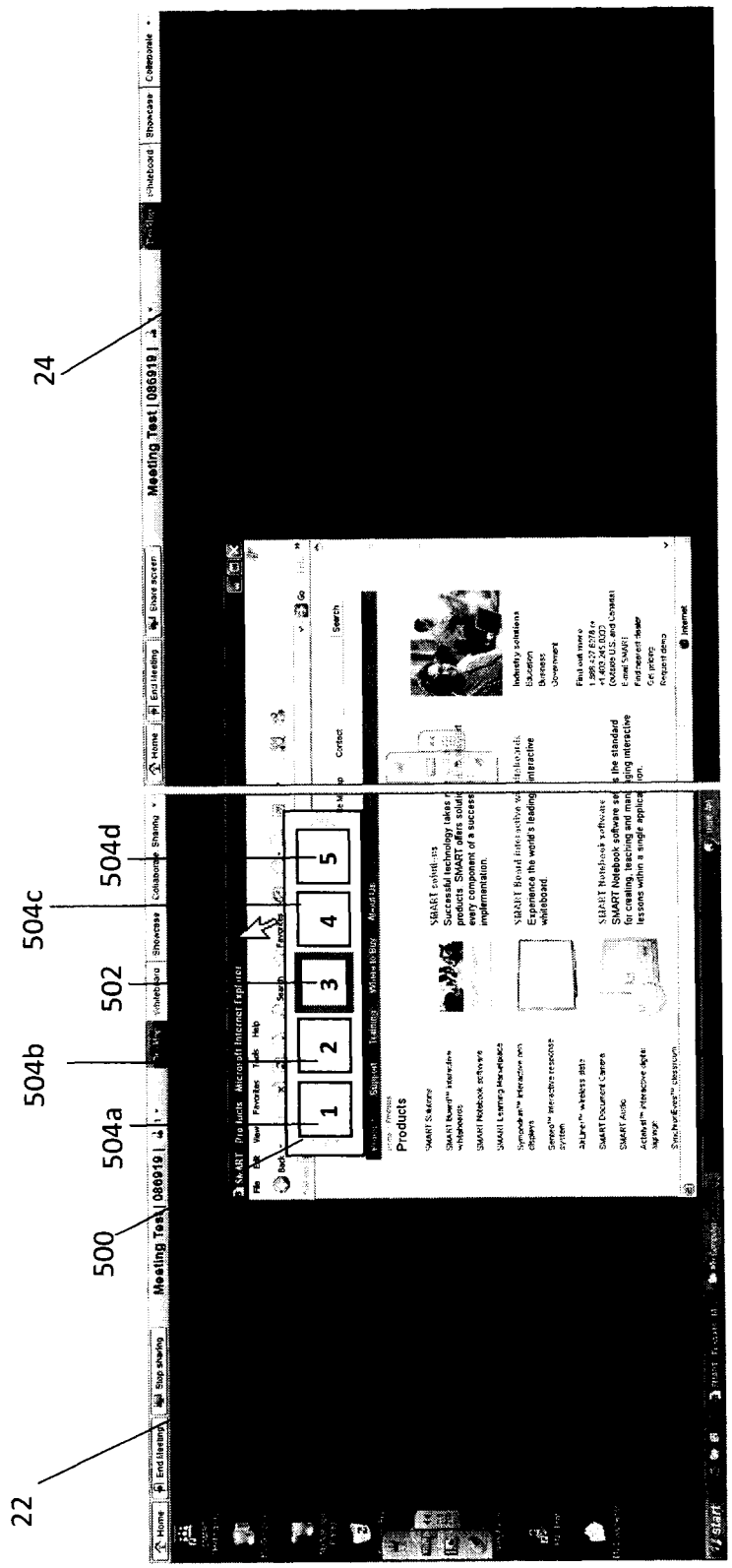
FIG. 10 shows movement of an application window in response to the pointer-down input gesture on the application window together with a destination physical display device selection dialog box.

Once the threshold condition has been satisfied (step 402), the application management procedure displays a dialog box 500 with a set of icons representing potential destination or target physical display devices 504a-d for selection by the user, as shown in FIG. 10. The potential destination physical display devices are determined by request from the application management procedure to the Windows™ operating system for a list of all physical display devices that are currently connected to the central computer 28. The application management procedure may register all physical display devices to which the central computer 28 is connected and further associate them with relative positions so as to properly position the icons of the physical display devices in the dialog box 500 for ease of selection by a user. It will be noted that the current physical display device in which the application window resides is made visually distinct from the potential destination physical display devices in the dialog box 500, in this case by bolding the border of its icon (and otherwise by flashing the thumbnail, for example). Arrows are shown in the dialog box 500 for enabling a user to scroll along a greater set of potential destination physical display devices in either direction.

While the potential destination physical display devices shown in FIG. 10 are numbered, for each potential destination physical display device identified in response to the request(s), the application management procedure may paint a miniature image of the destination physical display device using a basic graphic scaling algorithm or optionally a direct hardware capture or hardware scaling thereby to create an array of thumbnails, applied to what is currently being displayed in each potential destination physical display device. The array of thumbnails is then output for display in the dialog box 500.

In FIG. 10, the application window has been dragged by a pointer-dragging input gesture on the title bar of the application window out of the display device about 30% of the width of the application window. The user is able to continue dragging the window to the next adjacent destination display device if desired without having to select a destination physical display device 504a-d from the dialog box 500. To facilitate this, the application management procedure continually determines whether a destination physical display device has been selected (step 406) as the application window is continually dragged and its position monitored (step 412) by the application management procedure. While the application window is displayed on two physical display devices (step 414), the application management procedure continues to monitor whether a destination physical display device has been selected from the dialog box 500, and monitor application window positioning. If the application window has been dragged all of the way into the adjacent physical display device and thus only is displayed in the physical adjacent display device, the application management procedure considers the move to have been completed manually by the user, and the dialog box is hidden once again by the application management procedure (step 416).

If, at step 406, the user selects one of the destination physical display devices 504a-d in the dialog box 500 by releasing the application window via a pointer up event and selecting the icon for the selected destination physical display device 504a-d, the dialog box 500 is hidden, and the application window is moved entirely to the selected destination physical display devices 504a-d by the application management procedure.

A subset of all potential destination physical display devices 504a-d may be automatically selected by the application management procedure for display in the dialog box 500 from the total number of destination physical display devices to which the personal computer 28 is connected based on the nature of the pointer-dragging input gesture discussed above. This is useful where there are a large number of potential destination physical display devices from which a user can choose. For example, if the user performs a pointer-down input gesture involving dragging in a particular direction (i.e. towards a particular edge of the display device), only those destination display devices registered by the application management procedure as being physically in that direction relative to the current physical display device are shown in the dialog box 500.

During movement of the application window from one physical display device to another, if the display area coordinates of the two physical display devices are different, the central computer 28 adjusts the coordinates of the application window to conform to the display area coordinates of the destination physical display device.

The application management procedure may comprise program modules including but not limited to routines, programs, object components, data structures etc. and may be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments have been described above with reference to the figures, those of skill in the art will appreciate that variations and modifications may be made without departing from the spirit and scope thereof as defined by the appended claims.

What is claimed is:

1. A method for establishing a conference session between a primary computing device and one or more participant computing devices, comprising:
    creating a conference session for the primary computing device, the primary computing device comprising at least one primary display device on which content to be shared is displayed; and
    for each participant computing device upon successful joining to the conference session, automatically sharing content displayed on the at least one primary display device with the participant computing device for display thereby.

2. The method of claim 1, further comprising displaying an indicator on at least one primary display device that identifies the number of participant computing devices successfully joined to the conference session.

3. The method of claim 2, further comprising, in response to a selection of the indicator, displaying a dialog box on at least one primary display device identifying the participant computing devices that are successfully joined to the conference session.

4. The method of claim 3, further comprising, in response to selection of a participant computing device identified in the dialog box, automatically sending a share screen request to that participant computing device.

5. The method of claim 1, wherein said creating is initiated in response to user selection of an application program on said primary computing device.

6. The method of claim 5, further comprising, in response to user selection of the application program, displaying a toolbar on the at least one primary display device, the toolbar forming content that is to be shared.

7. The method of claim 6, wherein said creating comprises assigning a name and code to the conference session, updating the toolbar so that the toolbar presents the name and conveying the code to users of participant computing devices invited to join the conference session, the assigned code being used to join the conference session.

8. The method of claim 7, further comprising, prior to said automatically sharing content, prompting the user of the participant computing device to enter the code and upon validation of the entered code, automatically sharing content.

9. The method of claim 6, wherein the primary computing device comprises a plurality of primary display devices and wherein said displaying comprises displaying the toolbar on each primary display device.

10. The method of claim 9, wherein said creating comprises assigning a name and code to the conference session, updating each toolbar so that each toolbar presents the name and conveying the code to users of participant computing devices invited to join the conference session, the assigned code being used to join the conference session.

11. The method of claim 10, further comprising, prior to said automatically sharing content, prompting the user of the participant computing device to enter the code and upon validation of the entered code, automatically sharing content.

12. A method of joining a participant computing device to an existing conference session between a primary computing device and one or more other participant computing devices, the method comprising:

transmitting, by a participant computing device wishing to join the conference session, an access code to a conference server for validation;

upon validation of the access code, joining the participant computing device to the conference session and automatically receiving, at the participant computing device, content displayed on at least one primary display device of the primary computing device that is to be shared and displaying the shared content on a secondary display device of the participant computing device.

13. The method of claim 12, wherein said received content comprises a toolbar displayed on the at least one primary display device.

* * * * *